March 7, 1939. B. A. WALLACE 2,149,753
COMPOSITE SELECTOR CIRCUIT
Filed July 20, 1936 4 Sheets-Sheet 2

Inventor:
Bert A. Wallace
By
Attorney.

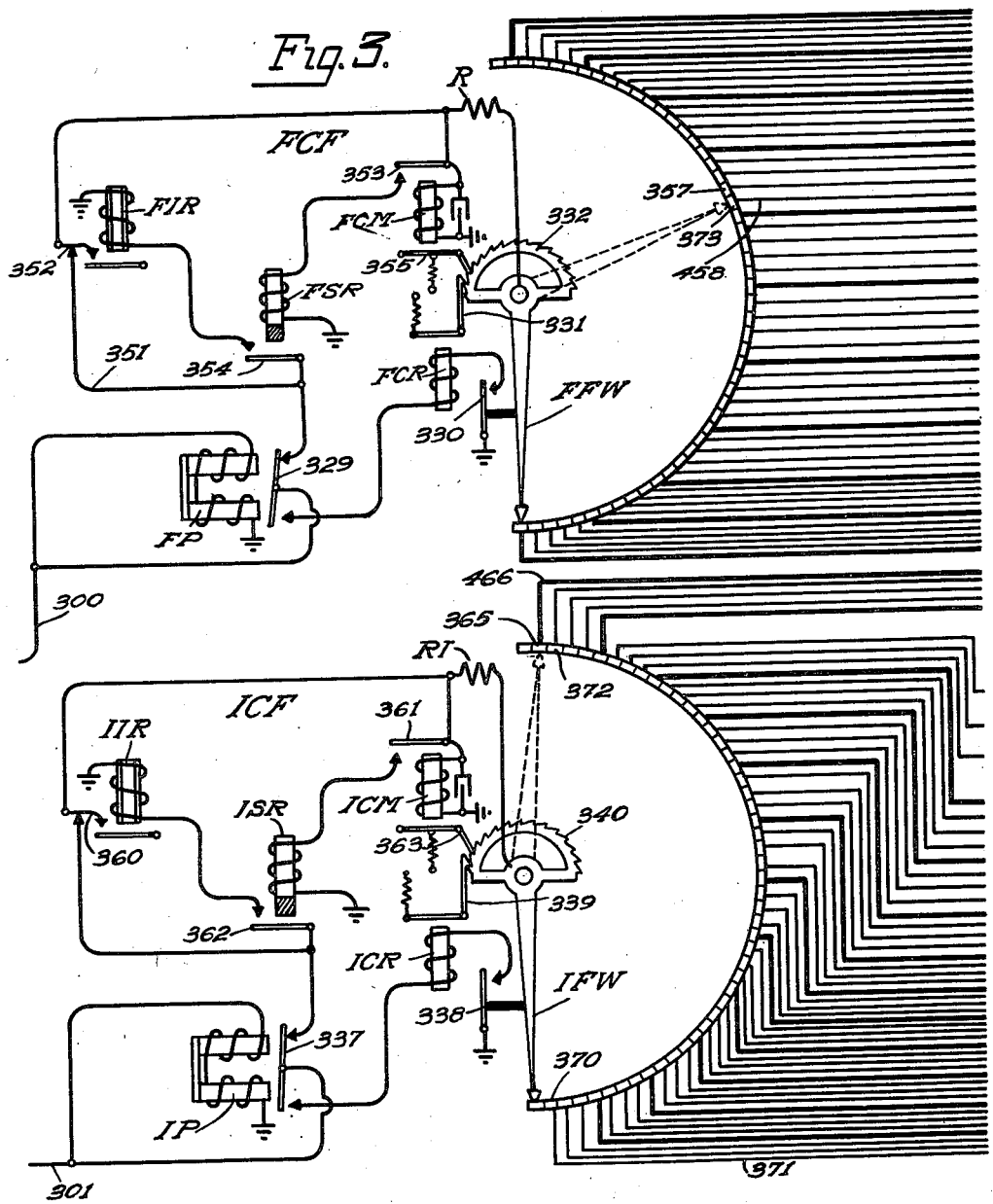

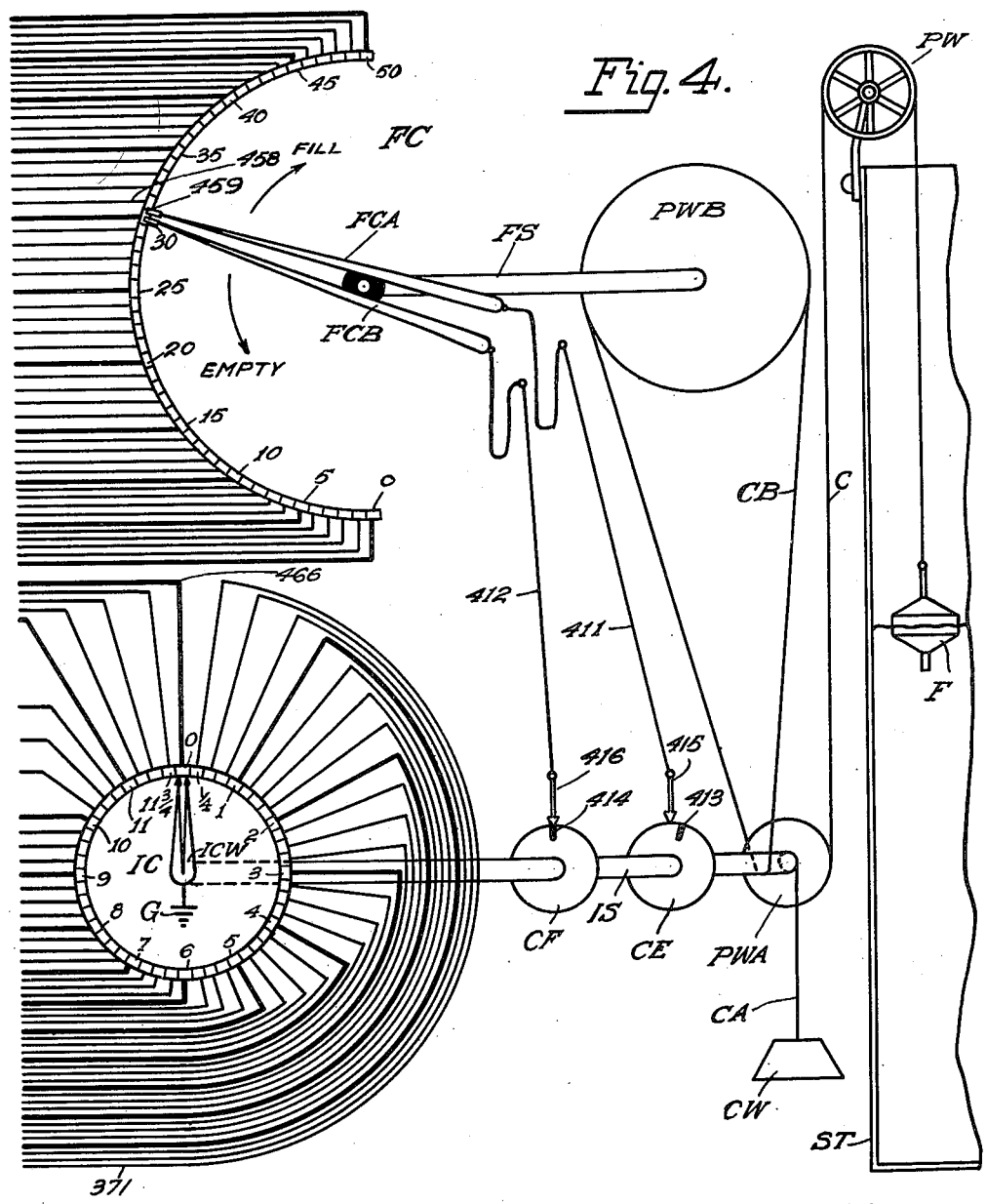

Patented Mar. 7, 1939

2,149,753

UNITED STATES PATENT OFFICE 2,149,753

COMPOSITE SELECTOR CIRCUIT

Bert A. Wallace, Oak Park, Ill., assignor to Kellogg Switchboard and Supply Company, Chicago, Ill., a corporation of Illinois Application July 20, 1936, Serial No. 91,471

5 Claims. (Cl. 177—353)

My present invention relates to a composite selector circuit for use with an electrical registering system such as disclosed in my application for U. S. Letters Patent, filed November 25, 1935, Serial No. 51,553. Such a system is applicable for registering at a central point the amount of the contents of tanks of a remote group and provides a single master register which may be connected to any one of the remote tanks. The tanks and central office may be located many miles from each other and consequently the cost of running a pair of conductors from each tank to the central office may prohibit the use of such a system.

My present invention overcomes this difficulty by providing a selector located at the group of tanks and operable over a single pair of conductors from the central office at which the master register is located to connect the master register to any one of the tanks.

A difficulty in the use of such a selector is that the impulses of current which operate the register device often interfere with the selector causing it to step or release during a connection and it is an object of my invention to provide a selector which is not affected by such impulses of current or any stray currents.

It is an object of my invention to provide a simple, inexpensive and efficient selecting means for connecting a master register of the above type to apparatus at any one of a plurality of tanks.

A feature of my invention is the provision of means whereby a dial selection of multi-line extensions can be made over a two wire line which becomes a part of the through connection after the selection is made.

A further feature of my invention is the provision of a selector which can be operated from a source of current located at the central office and which requires no local battery supply.

Another feature of my invention is the provision of a selector which can only be released by the sending of a predetermined number of impulses of current of the proper polarity.

Another feature of my invention is the provision of an indicating device at the operating station which shows the position of the selector switch and thereby indicates the tank to which it is connected.

Further objects of my invention will be readily apparent from the following specification and claims considered with the accompanying drawings which represent a particular preferred embodiment of my invention.

Figure 1:
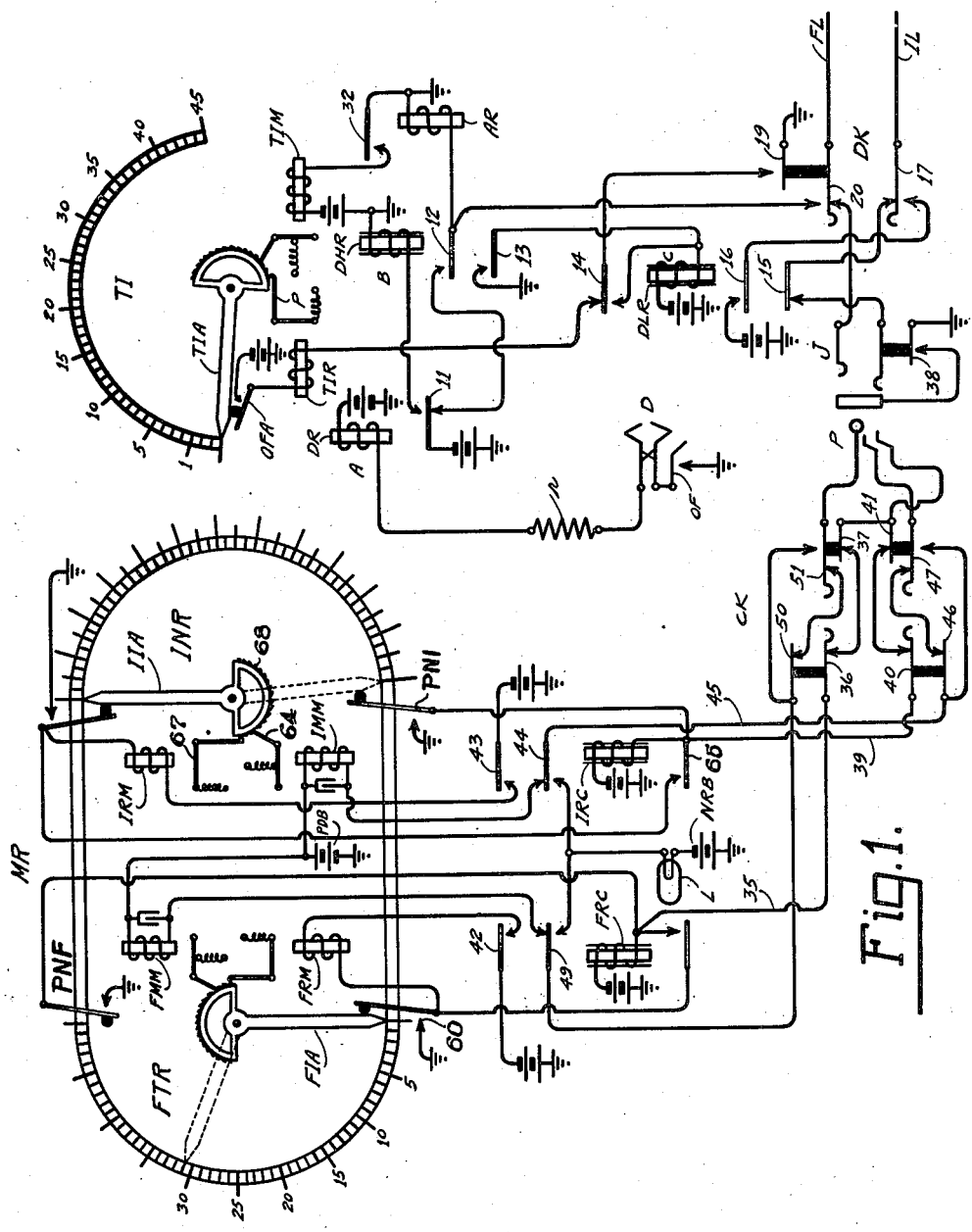
Figure 2:
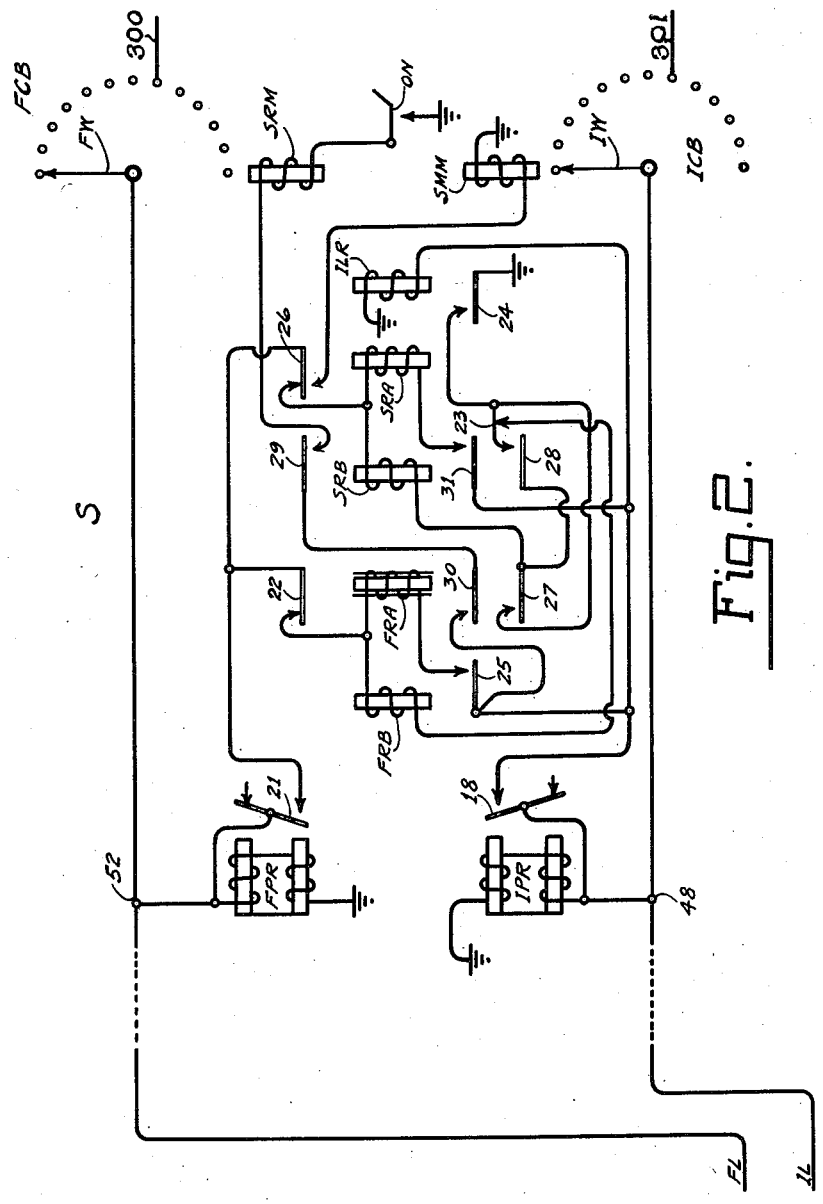

The drawings comprise Figs. 1, 2, 3 and 4, and when Figs. 2, 3 and 4 are placed in order to the right of Fig. 1, they show the circuit arrangement of my invention. On Fig. 1 is shown the register which is located at the office. The conductors FL and IL at the right of Fig. 1, form a trunk line which extends from the office to the tank field and terminates in the selector switch shown in Fig. 2, by means of which any one of the tanks at the field may be associated with the register of Fig. 1. Figs. 3 and 4 show the controlling apparatus such as is individual to and associated with each tank. The apparatus of Figs. 3 and 4 is identical with that shown in the prior application, Serial No. 51,553, above referred to.

Central office equipment

Fig. 1 which illustrates the electrical circuit arrangement of the apparatus located at the central office comprises principally the master register shown at the left of the drawing and the tank dialing and indicating means shown at the right.

The master register consists of a foot register FTR and an inch register INR, each of which has a scale and an indicating arm in association therewith for indicating or registering the contents of any tank with which it is connected. A foot motor magnet FMM operates under the influence of impulses of current from the positive drive battery PDB to step the foot indicator arm FIA over the scale to a position (shown in dotted lines) corresponding to the height in feet of the contents of the tank. Likewise, an inch motor magnet IMM operates under the influence of impulses of current from the said positive drive battery PDB to step the inch indicator arm IIA to a position corresponding to the height of the contents of the tank. A foot release magnet FRM and an inch release magnet IRM operated by current from a negative release battery NRB are provided to restore the indicating arms FIA and IIA to their normal or zero indicating position. A control key CK is provided to permit the operator to control the master register. A plug P is also provided and is adapted to be inserted into any one of a plurality of jacks J which are in association with lines leading to different groups of tanks.

Dialing control and tank indicator

The dialing control comprises a dial key DK and a dial D together with a dialing relay DR, a dial hold relay DHR and a dial lock relay DLR. An auxiliary relay AR controls the energizing circuit of a tank indicator motor magnet TIM which steps the tank indicator arm TIA over the scale of the tank indicator TI so as to show which tank in the group has been selected by the selector located at the remote point. A tank indicator release magnet TIR controls the restoration to normal of the tank indicator arm TIA. A pair of conductors shown as the foot lead FL and the inch lead IL extend to the selector S shown in Fig. 2. The dotted portion of the lines denote a variable distance.

Selector apparatus

The selector S includes a pair of polarized relays, IPR connected to the inch line IL, and FPR connected to the foot line, constructed to be energized by current of a certain polarity. The inch polarized relay IPR controls the energizing circuit of an inch line relay ILR. The foot polarized relay FPR controls the original energizing circuits of the first impulse release relays FRA and FRB and also the circuits of the second impulse release relays SRA and SRB. These release relays in turn control the respective energizing circuits of the selector motor magnet SMM which steps the wipers IW and FW over the contacts of the bank and the selector release magnet SRM which restores the wipers to their normal position. The contacts of the bank are each connected to certain electrical equipment located at and associated with the respective tanks of the group. This equipment shown in Figs. 3 and 4, is described in my pending application Serial No. 51,553. The master register MR, shown in Fig. 1, may be connected, first by means of the plug P, to any group of tanks by inserting the plug P into the proper jack J, in which terminates a trunk line leading to the desired group of tanks. Then any tank in that group may be connected to the register MR by means of the selector S, which is stepped to the contacts associated with a trunk leading to the desired tank.

Tank apparatus

Fig. 4 shows a storage tank ST, the fluctuation in the contents of which causes the rise and fall of a float F to which is secured a cable C which passes over a pulley wheel PW located at the top of the storage tank ST and is adapted to be wound upon a pulley wheel PWA, rigidly fastened to an inch shaft IS. It may be here noted that the cable C drives the shaft IS and the shaft FS is driven from the shaft IS, through the medium of the flexible belt or chain CB. The various drive pulleys and the connections are such that the shaft IS is driven by the cable C to cause its associated brush or wiper to move from one inch contact to the next inch contact to indicate by inches the change in the height of liquid in the tank while the shaft FS is driven at a rate to cause its brushes or wipers to move from contact to contact to indicate by feet the change in the height of the liquid in the tank. Thus, the foot wiper will move from one contact to the next while the inch wiper is making one revolution. In the embodiment shown, the contacts associated with the inch contact wiper ICW are arranged to give one quarter inch indications on the indicator. The operation is the same when the contacts are arranged to give indications for each change of one inch in the level of the contents of the tank. A counterweight CW acts on the shaft IS by means of the cable CA which is so arranged as to wind upon itself on the shaft IS to compensate for additional weight of the cable C as the contents of the tank decrease. In other words, as the cable CA is wound upon the shaft IS, due to the successive turns the cable becomes displaced a greater distance from the center of the shaft IS and the weight CW exerts a greater stress on the shaft IS, thus offsetting the greater weight of the cable C between the float F and pulley PW as the contents of the tank decrease.

Commutators CE and CF are also secured to the inch shaft IS as well as an inch contact wiper ICW. The inch contact wiper ICW is associated with an inch contact bank IC which comprises, in this particular embodiment, a group of 48 contacts, one for each quarter inch of a foot.

The rotatable foot shaft FS has rigidly secured thereto a pulley wheel PWB. A pair of foot contact wipers FCA and FCB are secured to the foot shaft FS and engage successive contacts in the foot contact bank FC as shaft FS rotates. These wipers FCA and FCB are rather close together and so arranged that they rest upon the same contact most of the time, but as the level of the contents of the tank approaches an exact foot level, the wipers rest on adjacent contacts. If desired, the wipers FCA and FCB may be arranged to engage opposite sides of the same row of contacts in manner old and well known in the telephone art. As the contents of the tank increase and closely approach the next foot level, the leading wiper FCA engages the next higher contact while the lagging wiper FCB remains on the contact last engaged. As the contents of the tank decrease from an exact foot level the wiper FCB engages the next lower contact while the wiper FCA remains on the previously engaged contact. A cable CB passes around the pulley wheel PWB and the inch shaft IS. The pulley wheels and shafts are so arranged that upon movement of the float F a quarter of an inch, the inch contact wiper ICW is moved one contact and that for each one foot movement of the float F, the inch contact wiper ICW will make a complete revolution and will again rest upon the contact marked "zero" in the inch contact bank IC. The foot contact wipers FCA and FCB each move one contact for each complete revolution of the inch shaft IS.

The contacts of the inch contact bank IC are electrically connected to a contact bank of an inch contact finder switch ICF shown in Fig. 3 of the drawings and the contacts in the foot contact bank FC are connected to a contact bank associated with a foot contact finder FCF also in Fig. 2. Associated with the contact bank for the inch contact finder ICF is an inch finder wiper IFW adapted to be driven by an inch contact motor magnet ICM which in turn is controlled by an inch interrupter relay IIR and an inch switch relay ISR. This switch is of the type which advances the contact wiper one step upon the restoration of the driving magnet ICM. An inch polarized relay IP controls an inch contact release magnet ICR which restores the inch finder wiper to normal.

The foot contact finder shown in Fig. 3 comprises apparatus similar to that disclosed in the inch contact finder, that is, the foot contact motor magnet FCM steps the foot finder wiper over the contacts associated therewith under the control of the foot interrupter relay FIR and the foot switching relay FSR. The release of the switch is controlled by the foot polarized relay FP and the foot contact release magnet FCR.

The apparatus shown in Figs. 3 and 4 is individual to a storage tank and has a single pair of conductors, 300 and 301, extending from it to the selector shown in Fig. 2 which is located adjacent to the tank field.

As the contents of the storage tank ST increase, the float F rises and causes the rotation of the inch shaft IS. For each one-fourth inch rise of the float, the inch contact wiper ICW moves to the next contact. The inch contact wiper ICW is shown as two wipers, both of which contact the same contact due to their adjustment. However, they may engage two adjacent contacts at the moment of transition from one contact to the next. The wiper ICW and the inch shaft IS are connected to ground G. The foot contact wipers FCA and FCB are electrically connected respectively to the commutators CE and CF by conductors 411 and 412 and brushes 415 and 416. Commutator CE has an insulated portion 413 and commutator CF has an insulated portion 414. The wiper FCA is connected to ground through the commutator 413 and inch shaft IS at all times except at the instant when the wiper ICW passes from the zero contact to the 11¾ inch contact which it does as the storage tank ST empties. At this instant, the contact 415 rests on the insulated portion 413 and the ground connection for the wiper FCA is broken. The wiper FCB is connected to ground G through the contact 416 and commutator CF at all times except at the instant when the inch contact wiper ICW passes from the 11¾ inch contact to the zero contact, which it does as the contents of the storage tank ST are increased.

This synchronized control betwen the two wipers is necessary because the proper contact must be connected to ground to prevent the selection of the wrong contact by the finder switch of Fig. 3. The inch wiper ICW and the foot wipers FCA and FCB at all times are in the position to indicate the proper level of the contents of the tank ST and as shown in the drawings, indicate a 31 foot level in the tank ST. The foot contact finder FCF and the inch contact finder ICF of Fig. 2 are normally as shown in the figure and the wipers shown in dotted lines indicate their proper position for the 31 foot level in the tank ST.

*Operation of system*

My system operates in the following manner. We will assume that the attendant desires to ascertain the contents of a certain tank which we will assume is tank number thirty-five associated with the line and selector shown in Fig. 2 of the drawings. The tank equipment of Figs. 3 and 4 will be electrically connected to the thirty fifth set of contacts in the contact banks ICB and FCB in the following manner. The dial key DK associated with the desired selector will be moved to its operated position. If at this time the tank indicator arm TIA is in an actuated position, the off-normal contacts OFA will be closed and an energizing circuit for the tank indicator release magnet TIR will be complete. This circuit can be traced from grounded battery through the off-normal contacts OFA, winding of TIR, normal contact 14 of dial lock relay DLR, and alternate contact 19 of key DK to ground. The release magnet TIR energizes and withdraws the pawl p from the ratchet teeth on the arm TIA which restores to normal under the influence of a spring not shown. If the arm TIA was in its normal position when the dial key DK was operated, the off-normal contacts OFA would be open and no circuit for the release magnet would be completed.

Next the attendant operates the dial D to cause the selector S to select the conductors leading to the equipment at the desired tank. A certain number, of course, is assigned to each tank and the attendant will dial that number. In the embodiment of my invention shown here the switches used are fifty point switches, in which the wipers are rotatable in a single plane; therefore, should the conductors of the desired tank be connected to contacts above ten, it will be necessary to dial ten first and then the second digit; if above twenty, the ten will be dialed twice and then the units digit of the line. The switch wipers IW and FW remain on the contacts last used until a new line is to be selected and the first two dialing impulses on the new connection are used to restore the wipers IW and FW to their normal position. Therefore, it is necessary to dial the digit "2" before each new connection and consequently each tank number will have "2" as the first digit. Tank thirty-five being the one desired, the attendant will dial 2—0005, which is the dialing number of tank thirty-five.

As soon as the dial D is operated, the off-normal contacts OF are closed to establish an energizing circuit for the dialing relay DR which relay is operated by current flowing from grounded battery, winding of DR, resistance r, dial D, and off-normal contacts OF to ground. Dialing relay DR closes its alternate contact 11 to establish an obvious operating circuit for the dialing hold relay DHR which is of slow to release construction. The closure of alternate contact 13 of relay DHR establishes an obvious energizing circuit for the dialing lock relay DLR which closes a locking circuit for itself through its own alternate contact 14 and alternate contact 19 of the dial key DK.

The closing of alternate contact 16 of relay DLR connects current of negative polarity to the inch conductor IL of the line and causes the energization at the selector S of the inch polarized relay IPR which is responsive to this type of current. This circuit can be traced from a battery, which has its positive pole grounded through alternate contact 16 of DLR, alternate contact 17 of dial key DK, inch line IL, through the winding of relay IPR to ground. Relay IPR operates and closes its alternate contact 18 which extends the negative battery current to the winding of the inch line relay ILR and thence to ground. Relay ILR is operated by the current flowing through the described circuit and operates contact 24.

As the dial D returns to its normal position the energizing circuit of the dialing relay DR is interrupted twice and as the relay DR is fast acting it restores its contact 11 to its normal position each time its circuit is broken. As the dialing hold relay DHR is slow to release it will remain energized during the brief interval that its circuit is opened at contact 11 of relay DR. Therefore, each time the contact 11 of DR is restored to normal an impulse of current of negative polarity will be sent over the foot line FL. This current must be of the same polarity as that sent over the inch line as before described and may originate from the same battery. The drawings show separate batteries, but that is merely for the purpose of simplification and it is to be understood that either one battery or a plurality of batteries may be used to produce current of the proper polarity. The first impulse of current flows from battery, through normal contact 11 of DR, alternate contact 12 of DHR, alternate contact 20 of key DK, foot line FL through the winding of foot polarized relay FPR to ground. The relay FPR is energized by current flowing over this circuit and attracts its armature 21 to extend the battery potential to the first impulse release relays FRB and FRA. The current flows from the foot line FL through alternate contact 21, normal contact 22 of FRA, winding of FRB, normal contact 23 of SRB, and alternate contact 24 of ILR to ground. Release relay FRB closes its alternate contact 25 to complete a circuit for the relay FRA which does not energize at this time because it has negative battery potential on each side of its winding. This circuit can be traced from grounded battery, alternate contact 16 of DLR, alternate contact 17 of key DK, inch line IL, alternate contact 18 of IPR, alternate contact 25 of FRB, windings of relays FRA and FRB, to ground at alternate contact 24 of ILR.

When the first impulse on the foot line FL ceases the relay FPR restores and contact 21 is opened. Immediately upon the opening of this contact the relay FRA is energized by current flowing over the previously described circuit and the relay FRB is also maintained operated. Relay FRA opens contact 22 so that the second impulse of current caused by the dialing operation will be extended to the second impulse release relays SRA and SRB. This second impulse of current operates relay FPR which closes contact 21 to extend the current through normal contact 26 of SRA, winding of SRB, alternate contact 27 of FRA, to ground at alternate contact 24 of ILR. Relay SRB energizes and closes contact 29 which completes an energizing circuit for the selector release magnet SRM. This circuit may be traced from the negative battery on the inch line IL through closed contact 18 of IPR, alternate contact 30 of FRA, alternate contact 29 of SRB, through the winding of SRM and off-normal contacts ON to ground. The magnet SRM energizes and restores the wipers FW and IW to their normal position, which restoration opens the off-normal contacts ON and breaks the energizing circuit of the selector release magnet SRM.

Meanwhile the second impulse release relay SRB has also closed alternate contact 31 to prepare a circuit for the second impulse release relay SRA which circuit, however, is not effective until the negative battery is removed from the foot line FL, at which time the relay SRA energizes and the relay SRB is held energized by current flowing over the inch line IL, alternate contact 18 of IPR, alternate contact 31 of SRB, windings of SRA and SRB, alternate contact 28 of SRB to ground at alternate contact 24 of ILR. The closing of alternate contact 28 of relay SRB also opens the holding circuits for the first impulse release relays FRA and FRB whih deenergize and restore their contacts to normal. The closing of alternate contact 26 of SRA extends the battery circuit to the selector motor magnet SMM. From the foregoing it is evident that the selector switch will not be released and conditioned for setting up a connection until two impulses of current of the proper polarity are received over one side of the line while current of the proper polarity is present on the other side of the line.

Each time the relay DR closed normal contact 11, an energizing circuit for the auxiliary relay AR was completed, current flowing through normal contact 11 of DR, alternate contact 12 of DHR and through the winding of relay AR to ground. Relay AR energized and closed alternate contact 32 to complete an obvious energizing circuit for the tank indicator motor magnet TIM, which stepped the tank indicator arm TIA one step for each energization. The tank indicator TI has its scale graduated in such a manner that the two first energizations are absorbed and do not appear as tank indications.

The next digit to be dialed will be "0" which will cause the contacts of the dial D to be opened ten times. Each time the contacts are opened the dial relay DR is deenergized and closes normal contact 11 which connects battery to the foot line FL and through alternate contact 21 and 26 to the winding of the selector motor magnet SMM which steps the wipers FW and IW to the tenth set of contacts. The tank indicator motor magnet TIM is also energized ten times and steps the tank indicator arm TIA in unison with the wipers FW and IW of the selector S.

In selecting tank thirty-five it is necessary to dial the digit "0" three times and dial the digit "5" which will step the wipers FW and IW to the thirty fifth set of contacts in the bank, whereupon they will be connected to the line conductors leading to the necessary electrical equipment at tank number thirty-five. The tank indicator arm TIA will also indicate that the wipers FW and IW are connected to the proper contacts and the attendant by glancing at the indicator will know that the desired tank has been selected and will thereupon restore the dial key DK to its normal position. This restoration of the key DK will restore contact 19 which breaks the locking circuit of relay DLR which restores its contact 16 to disconnect battery from the contact of key DK and closes contact 15 which extends the inch line IL to the jack J.

Next, the attendant will insert the plug P associated with the master register into the jack J associated with the selector S and move the control key CK to its neutral or release position. The master register MR which comprises an inch register INR and a foot register FTR is so constructed as to restore to its zero indicating or normal position at the commencement of each registration. Accordingly the insertion of plug P into jack J completes an energizing circuit for the register conditioning relays FRC and IRC. The circuit for FRC can be traced from negative battery, through the winding of FRC, conductor 35, normal contacts 36 and 37 of key CK, sleeve contacts of the connected plug P and jack J to ground at alternate contact 38 of jack J. The energizing circuit for relay IRC can be traced from negative battery, the winding of relay IRC, conductor 39, closed contacts 40 and 41 of key CK, sleeve contacts of the connected plug P and jack J to ground at alternate contact 38 of the jack J. The relays FRC and IRC thereupon close their alternate contacts 42 and 43 to complete obvious energizing circuits for the respective release magnets FRM and IRM which restore the respective indicator arms FIA and IIA to normal.

When the relays IRC and FRC were energized they connected the negative release battery NRB to the conductors leading to the selector S and the equipment at the tank. The relay FRC through its alternate contact 49 connects negative release battery NRB to the foot line FL and establishes an energizing circuit for the foot polarized relay FP of the foot contact finder FCF of Fig. 3. The foot polarized relay FP is energized by current flowing from the negative release battery NRB, lamp L, alternate contact 49 of FRC, closed contacts 50 and 51 of CK, tip contact of plug P and jack J, foot line FL, wiper FW, conductor 300 and through the winding of the foot polarized relay FP to ground. Relay FP energizes and its contact 329 assumes its alternate position to close an energizing circuit for the foot contact release magnet FCR which is energized by current flowing from the negative release battery over the previously described path through alternate contact 329, the winding of foot contact release relay FCR and off-normal contact 330 to ground. Of course, if the foot finder wiper FFW is in its normal position the off-normal contact 330 will be opened and the relay FCR will not energize. Upon the energization of the foot contact release relay FCR, the pawl 331 is withdrawn from the ratchet 332 and the foot finder wiper FFW is returned to its normal position under the influence of a coil spring not shown. When the wiper FFW returns to normal, the off-normal contact 330 is opened and the circuit for the foot contact release relay FCR is broken.

The inch register conditioning relay IRC causes the restoration to normal of the inch finder wiper IFW by closing its alternate contact 44 which connects negative release battery to the inch line IL and causes the energization of the inch polarized relay IP. The relay IP is energized by current flowing from negative release battery NRB, lamp L, alternate contact 44 of IRC, closed contacts 46 and 47 of CK, sleeve contacts of plug P and jack J, conductor IL, wiper IW, conductor 301 and winding of the inch polarized relay IP to ground. The inch polarized relay IP moves contact 337 to its alternate position to establish an energizing circuit for the inch contact release relay ICR which is energized by current flowing from the negative release battery over the previously described circuit, through alternate contact 337 of IP, relay ICR, and off-normal contact 338 to ground. The relay ICR energizes and withdraws pawl 339 from the ratchet 340 and allows the inch finder wiper IFW to be restored to normal under the influence of a coil spring not shown. The restoration to normal of the inch finder wiper IFW opens the off-normal contact 338 which breaks the energizing circuit of the inch contact release relay ICR which restores to normal. If the inch wiper IFW was already in its normal position, the off-normal contact 38 would be opened and the inch contact release relay ICR would not operate. Thus, all apparatus is restored to normal preparatory to its operation. As the polarized relays FPR and IPR, at the selector, are connected in ground branches from conductors FL and IL, these relays are energized in parallel with the polarized relays FP and IP associated with the tank apparatus. Relay IPR closes a branch circuit which may be traced to ground through the winding of relay ILR. Relay FPR completes a branch path through contacts 21 and 22, winding of relay FRB to ground at alternate contact 24 of relay ILR. Relays ILR and FRB, which were energized become deenergized when the key CK is moved to its "read" position due to reversal of battery to polarized relays IPR and FPR.

The throwing of the control key CK to its "read" position opens normally closed contacts 36, 37, 40, 41, 46, 47, 50 and 51, causing relays ILR, FRB, IRC and FRC to become deenergized. Moving key CK to "read" position closes alternate contacts 47 and 51 which connects the positive pole of battery to conductors IL and FL. One circuit can be traced from the battery PDB, through the winding of the foot motor magnet FMM, closed contact 49 of relay FRC, alternate contact 51 of key CK, the tip contacts of plug P and jack J, normal contact 20 of key DK to the foot line FL. Current flowing over this path has no effect on the foot polarized relay FPR as it is not responsive to current of this polarity; consequently, the effective flow of current is confined to the foot line FL, the foot wiper FW and its connected contact and line to the apparatus located at the tank.

Current also flows from battery PDB through the winding of the inch motor magnet IMM, closed contact 44 of relay IRC, conductor 45, alternate contact 47 of key CK, ring contacts of the connected plug P and jack J, normal contact 15 of relay DLR to the inch line IL and on through the inch wiper IW to the apparatus at the tank. The inch polarized relay IPR is not operated at this time as it is not responsive to current of this polarity.

*Foot register operation*

After the relays FRC and IRC are returned to normal, battery PDB which has its negative side grounded is connected through the foot motor magnet FMM, normal contact 49 of FRC, alternate contact 51 of control key CK, tip contact of the plug P and jack J, line FL, wiper FW, conductor 300, normal contact 329 of polarized relay FP, which only operates upon negative battery, conductor 351, normal contact 352 of FIR, through the winding of foot contact magnet FCM to ground. The foot magnet FMM of the foot register FTR is energized to condition foot indicator arm FIA for movement and the foot contact magnet FCM of the foot contact finder FCF conditions the foot finder wiper FFW for movement. The closing of alternate contact 353 of FCM establishes an energizing circuit for the foot switching relay FSR which is of the slow operating type. The relay FSR is operated by current flowing from battery PDB over the previously traced circuit through alternate contact 353 of FCM, through the winding of FSR to ground. Relay FSR closes its alternate contact 354 to establish an energizing circuit for the foot interrupter FIR which is energized by current flowing from the positive drive battery PDB over the previously traced circuit through alternate contact 354 of relay FSR, through the winding of the foot interrupter relay FIR to ground. This last relay energizes and opens its contact 352 to interrupt the energizing circuit of the foot switching relay FSR which restores its contact 354 to normal thereby opening the energizing circuit of the foot interrupter relay FIR which relay is of the slow-to-release type; and also deenergizes the foot contact magnet FCM which through the release of its armature 355 steps the foot finder wiper FFW to its first contact.

The deenergization of the foot motor magnet FMM of the master register restores its armature and causes the movement of the foot indicator arm FIA to the first contact which closes the off-normal contact 60. The foot interrupter relay FIR being of the slow-to-release type, permits the deenergization of the motor magnets FMM and FCM and then restores its contact 352 to normal to again close energizing circuits for the foot motor magnets FMM and FCM which again operate and cause the operation of the foot switching relay FSR and the foot interrupter relay FIR to repeat the stepping of the foot finder wiper FFW and the foot indicator arm FIA. This stepping continues in the above described manner until the foot finder wiper FFW engages a grounded contact which in the embodiment shown is the thirty-first contact in the bank as the contents of the tank ST are at the thirty-one foot level. When the foot finder wiper FFW reaches the thirty-first contact, a shunt circuit for the foot contact magnet FCM is established, through resistance R, foot finder wiper FFW, the contact engaged, thereby, conductor 458, contact 459, wiper arm FCA, conductor 411, contact 415, commutator CE, inch shaft IS to ground G. The motor magnet FMM is operated by current flowing over the previously described circuit, but its operation has no effect. The motor magnet FCM does not receive enough current to cause its operation.

Inch register operation

Meanwhile, the inch contact finder ICF and the inch indicator arm IIA have been stepping in unison to ascertain and indicate the inch level of the contents of the tank ST. Positive drive battery PDB supplies current to cause the energization of the inch motor magnet IMM and the inch contact magnet ICM. This current flows from battery PDB through the inch motor magnet IMM, normal contact 44 of IRC, alternate contact 47, contacts of the connected plug P and jack J, inch line IL, wiper IW, conductor 301, normal contact 337 of IP, normal contact 60 of IIR, through the winding of the inch contact magnet ICM to ground. The motor magnets IMM and ICM energize to condition their respective associated wipers for movement. The closing of contact 361 of inch contact magnet ICM establishes an energizing circuit for the inch switch relay ISR which is of the slow-to-operate type which relay closes its alternate contact 362 to establish an energizing circuit for the inch interrupter relay IIR from the positive drive battery over the previously traced circuit to alternate contact 362 of ISR, through the winding of the inch interrupter relay IIR to ground. The inch interrupter relay IIR energizes and opens its contact 360. This interrupts the energizing circuit of motor magnets IMM and ICM, thus, causing their associated armature 363 and 64 to move the inch finder wiper IFW and the inch indicator arm IIA one step. The deenergization of the inch contact magnet ICM opens the energizing circuit of the inch switching relay ISR at normal contact 361 which relay restores its contact 362 and thereby opens the energizing circuit of the inch interrupter relay IIR which is of the slow-to-release type. When IIR releases, it closes its contact 360 to reestablish the energizing circuit of the motor magnets IMM and ICM to cause the repeated stepping operation of the wiper IFW and the inch indicator arm IIA until the proper contact is reached by the inch finder wiper IFW.

When the grounded contact which in this case is 365 is reached by the wiper IFW, a shunt circuit for the inch contact magnet ICM is established, through resistance RI, the wiper IFW as shown in dotted lines, contact 365, conductor 466, the zero inch contact of the inch contactor IC, wiper ICW to ground G. This shunt circuit prevents the operation of the motor ICM and also of the inch interrupter relay IIR and the inch switch relay ISR and, accordingly, the wiper IFW remains on contact 65 and the inch indicator arm IIA of the inch register INR remains on the zero contact of the inch register. As both the foot indicator arm FIA and the inch indicator arm IIA remain stationary, the attendant knows that the proper contacts have been reached by the wipers FFW and IFW and that the contents of the storage tank ST are exactly at the thirty-one foot level.

Contents of the tank rise one-quarter inch

Should the contents of the storage tank ST rise one-quarter of an inch from the thirty-one foot level, while the register is connected thereto, the inch contact wiper ICW will move from the zero contact to the one-quarter inch contact, and in so doing, will remove ground from the shunt circuit about magnet ICM, above described, which will permit the operation of the inch motor magnets IMM and ICM as well as the subsequent operation of the inch interrupter relay IRR and inch switching relay ISR. The operation of these relays will of course, deenergize the motor magnets IMM and ICM to step the inch finder wiper IFW to the last contact in the bank which is unwired. The inch indicator arm IIA is stepped past the zero indicating position to close the past normal contacts PNI which complete an energizing circuit for the inch conditioning relay IRC. The conditioning relay IRC opens its normal contact 44 to disconnect the positive drive battery PDB from the conductor IL and closes its alternate contact 44 to connect the negative release battery to the line IL. The inch polarized relay IP shifts its contact 337 to its alternate position to close an energizing circuit for the inch contact release relay ICR which relay operates to remove the pawl 339 from engagement with the ratchet teeth 340 to permit the wiper IFW to restore to its normal position. The closure of contact 43 of the inch register conditioning relay IRC closes an energizing circuit for the inch release magnet IRM which magnet is energized by current flowing from grounded battery through the alternate contact 43 of relay IRC, the winding of inch release magnet IRM, alternate contact 65 of IRC to ground at past normal contact PNI. The magnet IRM withdraws the pawl 67 from engagement with the ratchet teeth 68 and the inch indicator arm IIA is restored to normal under the influence of the spring as previously described. The restoration of the indicator arm IIA restores the past normal contacts PNI to their normal position thereby opening the energizing circuit for the inch relay IRC which restores its contact 44 to its normal position to disconnect the negative release battery NRB from the line and to connect the positive drive battery PDB to the line. The inch polarized relay IPR and the inch contact release relay ICR are also restored to normal and the off-normal contact 338 associated with the inch finder wiper IFW is also opened. The closure of normal contact 337 of the polarized relay IP again closes the operating circuits for the inch motor magnets IMM and ICM which cause the subsequent operation of the switching relay ISR and interrupter relay IIR to step the wiper IFW and the indicator arm IIA until the grounded contact is reached by the inch finder wiper IFW which in this case is the first contact 370, at which time the shunt circuit is again established from resistance RI, wiper IFW, contact 370, conductor 371, the quarter inch contact of the inch contactor IC, wiper ICW to ground G. The inch indicator arm IIA will stop at the first mark on the register to indicate the quarter of an inch and as the foot indicator arm FIA is still on the thirty-first mark on the foot register, the level of the contents of the tank will be indicated as thirty-one feet, one-quarter inch.

*Level falls one-quarter inch from thirty-one feet*

Should the level of the contents of the storage tank ST fall one-quarter inch below the thirty-one foot level, the inch contact wiper ICW will move to the eleven and three-quarter inch contact, thereby opening the shunt circuit of the motor magnet ICM and permitting the same to operate to step the inch finder wiper IFW and the inch indicator arm IIA to their past normal position, at which time the past normal contacts PNI will be closed to cause the operation of the inch register conditioning relay IRC, the inch release magnet IRM, the inch polarized relay IPR and the inch contact release relay ICR, which relays energize as above described to restore the wiper IFW and the inch indicator arm IIA to normal. As the first contact is not grounded, the wipers will continue to step until the inch finder wiper IFW engages the eleven and three-quarter inch contact 372, at which time the shunt circuit for the motor magnet ICM will again be established to ground G at wiper ICW and the eleven and three-quarter inch contact. At this time the inch indicator arm IIA will be indicating the eleven and three-quarter inch level.

At the same instant that the inch contact wiper ICW breaks connection from the zero bank contact the commutator CE breaks the ground connection from the overlapping foot contact wiper FCA which is on bank contact 31. This removes the shunt circuit from the foot finder switch motor magnet FCM. Magnets FCM and FMM now operate in unison to step their respective wipers to their past normal position at which time the past normal contacts PNF are closed to establish an energizing circuit for the foot conditioning relay FRC which relay opens its normal contact 49 to disconnect the positive drive battery PDB from the foot line FL and closes its alternate contact 49 to connect the negative release battery to the foot line FL to cause the operation of the polarized relay FP, which relay causes its armature 329 to move to its alternate position to complete an energizing circuit for the foot contact release magnet FCR, through the closed off-normal contacts 330. The release magnet FCR withdraws its pawl 331 from the ratchet teeth 332 to permit the wiper FFW to return to its normal position. At the same time, the foot register relay FRC has closed its alternate contact 42 to establish an obvious energizing circuit for the foot release magnet FRM which magnet restores the foot indicator arm FIA to its normal position, thereby opening the energizing circuit for the foot release magnet FRM at off-normal contact 60 which also opens the holding circuit for the foot register relay FRC. The original energizing circuit for the relay FRC is opened at past normal contact PNF. The restoration to normal of the contact 49 of relay FRC again closes the operating circuits for the foot motor magnets FMM and FCM which will step their associated wipers until the foot finder wiper FFW makes connection with the thirty foot bank contact 373, which is connected to the thirty foot contact in the bank FC, then engaged by the lagging wiper FCB which wiper is now connected to the ground G through conductor 412 and commutator CF. The indication on the register is now thirty feet, eleven and three-quarter inches.

*The level rises one-quarter inch from the thirty feet eleven and three-quarter inch registration*

When the level in the contents of the storage tank ST rises one-quarter of an inch from the thirty feet, eleven and three-quarter inch mark, the inch switch contact wiper breaks the ground connection from the eleven and three-quarter inch bank contact and steps ahead to the 0 position which is now grounded by the wiper ICW in the manner already described. The inch magnets IMM and ICM will step their wipers in unison until the wiper IFW engages the 0 contact 365 at which time the shunt circuit will again be closed and the indicator arm IIA will indicate no inches on the master register.

At the same instant that the inch contact wiper ICW breaks connection with the eleven and three-quarter inch bank contact, the commutator CF breaks the ground connection from the brush 416 to the lagging foot contact wiper FCB in the bank contact 30. This removes the stopping shunt from the foot wiper switch motor magnet FCM and the master foot magnet FMM and these magnets step their associated wiper arm FFW and indicator arm IIA to the thirty-one foot position where the foot finder wiper FFW engages contact 357 which makes a ground connection through conductor 458, contact 459, and overlapping wiper FCA, conductor 411, brush 415, commutator CE and inch shaft IS to ground G. The master register again registers thirty-one feet which is the level of the contents of the tank as shown.

When the level of the contents of the storage tank ST rises at any point within the same foot from the one-quarter inch to eleven and three-quarter inches, the inch indicator arm IIA follows in the one-quarter inch steps while the foot reading remains constant.

As the foot contactor brush moves over but a single contact while the inch contactor brush moves through a complete revolution, it is difficult to so mechanically arrange the contact bank and relation between the brushes that the foot contactor brush will move from one of its contacts to the next at the very instant that the inch contactor brush moves from its eleven and three-quarter inch contact to its zero contact or vice versa. This difficulty is magnified by the fact that it is exceedingly difficult to create a contact bank, the contacts of which are exactly spaced throughout the whole range, particularly as the dimensions of the bank vary slightly due to changes in temperature and humidity. It is to prevent an error arising on account of this variation that the foot contactor is provided with two brushes which are arranged to be normally grounded but which have their grounds removed as the inch contactor brush passes from its eleven and three-quarter inch contact to its zero contact or from its zero contact to its eleven and three-quarter inch contact. It will be understood that the two brushes FCA and FCB of the foot contactor are very close together and during most of the time rest upon the same contact in the bank. It is only during the period when the level of the tank is changing to the next succeeding foot level position that these two brushes occupy adjacent contacts. Thus, the interrupter segment 414 is adapted to remove ground for a short time from the brush FCB when the inch contactor brush moves to a position slightly beyond the eleven and three-quarter inch position and if the tank is being emptied, the commutator segment 413 acts to remove ground from the brush FCA for a short time when the level falls below the exact foot.

Thus, if the tank is being filled when a reading is taken and the inch contactor brush is in a position where it is about to move onto its zero contact, the interrupter segment 414 is so arranged that it will break the circuit to the foot contactor brush FCB at the instant the inch contactor brush ICW passes from eleven and three-quarter inches to zero which will prevent the possibility of obtaining a reading of five feet no inches when the reading should be six feet no inches.

If the tank is being emptied at the time a reading is taken, the segment 413 is so arranged as to remove ground from the brush FCA at the instant the inch contactor brush ICW passes from its zero contact to its eleven and three-quarter inch contact. This expedient insures that the ground will be removed from one foot contact and placed on the adjacent foot contact as the inch contactor passes from its eleven and three-quarter inch contact to its zero contact or vice versa, thus, insuring a correct reading even though there may be a slight lost motion in the connection between the inch contactor brush and the foot contactor brush or slight inaccuracies in the contact bank.

While it will be obvious from the above that the interrupter segments 413 and 414 must be placed so as to occupy very nearly the same angular position, nevertheless it is necessary that they do not coincide in their position, as in that case, there would be a certain position where neither of the two foot contactor brushes would be connected to ground and if a reading was taken at this time, it would result in the foot contact finder running wild, that is, hunting and releasing repeatedly. Thus, these interrupter segments are sufficiently angularly spaced apart so that one or the other of the foot contactor brushes is at all times connected to ground.

As the inch contact finder wiper and the foot contact finder wiper are arranged to step in their hunting movement at the same time, if the contents of the tank are low, say for instance five feet eleven and three-quarter inches, it is obvious that the foot contact finder will reach its stopping position before the inch contact finder does. If at the time a reading is being taken the contents of the tank are just below an exact foot level position, it is conceivable that the level of the tank may pass from the eleven and three-quarter inch level to the zero inch level during the period of time in which the inch contact finder brush is in movement after the foot contact finder brush has stopped, in which case, were it not for the applicant's expedient, there would be an error of one foot in the reading of the contents of the tank, as the reading would then appear five feet no inches.

However, as the inch contactor brush moves from its eleven and three-quarter inch position to its zero position, the foot contactor brushes will remove ground from the five foot contact and place ground on the six foot contact. This will remove ground from the contact occupied by the foot contact finder brush and the foot contact finder will start hunting and will step onto the next (sixth) contact where it will stop. The foot register arm will move in synchronism with the foot contact finder brush and will also step six times and the register will now indicate exactly six feet no inches.

If, while the tank is being emptied, the inch contactor moves from its zero to its eleven and three-quarter inch position during the period in which the inch contact finder brush is in movement after the foot contact finder brush has stopped, the mechanism described will act to remove ground from the sixth contact of the foot finder bank and place it upon the fifth contact. This will remove the ground from the contact occupied by the foot contact finder brush and the foot contact finder will start hunting and will step to the end of its arc. The foot register arm will move in synchronism with the foot contact finder brush and will also step to the end of its arc closing the past normal contact PNF which will bring about the release of the foot contact finder and the foot contact register as previously described.

Upon restoration to zero, the release magnets of the two switches will be deenergized and the foot contact finder wiper and the foot contact register arm will again start into motion, but this time will come to rest on their fifth contact indicating five feet, eleven and three-quarter inches.

While this occurrence may be comparatively infrequent, nevertheless were it not for the expedient provided by applicant in these rare instances, an error of one foot in the reading would be obtained.

The disconnection of the master register can be accomplished by moving the control key CK to its open position which disconnects all the conductors of the master register from the plug P. If the attendant first moves the control key CK to its release position, and then to its open position, energizing circuits for the release magnets FRM and IRM will be completed, as previously described, and the arms FIA and IIA will be restored to their normal or zero indicating position. The polarized relays FRA and FRB and the inch line relay ILR will also energize but the selector switch S will not be affected as two impulses of negative current are necessary on the foot line while the same current is present on the inch line to release the selector switch S. The subsequent movement of the key CK to its open position will open the circuits of all these relays which will restore their contacts to normal.

It is evident from the above description that a single impulse of current of either polarity will cause neither the further stepping or the release of the selector switch. Also, a series of impulses which are not of the release polarity, will not affect it. When the indicator arms of the master register are synchronized with the mechanism at the tank a single impulse of current of negative polarity is sent over both the foot line FL and inch line IL, but neither the stepping magnet SMM nor the release magnet SRM are operated. When the indicator arms FIA and IIA are being stepped by the motor magnets FMM and IMM which are energized by impulses of current of positive polarity flowing over the foot line FL and inch line IL the stepping magnet SMM and release magnet SRM are not affected. Consequently, it is evident that my novel circuit arrangement has overcome the difficulties experienced by the circuits of the prior art as disclosed in the introduction of my specification.

While I have shown and described a preferred embodiment of my invention, it is to be understood that changes and modifications will suggest themselves to those skilled in the art. I, therefore, desire to be limited only by the scope and spirit of the appended claims.

Having described my invention, what I claim is new and desire to secure by United States Letters Patent is:

1. A selector system comprising a control station and a remote station, a pair of conductors and common return connecting said stations, a polarized relay associated with each conductor responsive to current of predetermined polarity, a selector switch at the remote station having a stepping magnet and release magnet associated therewith, a source of current at the control station, means at said control station for causing a steady flow of current of the predetermined polarity to one of said conductors and the common return to thereby continuously operate the corresponding polarized relay and to intermittently apply a current flow of the predetermined polarity from said source to the other conductor and the common return to thereby intermittently operate the other polarized relay and means at said remote station responsive to the continued operation of the one polarized relay and the intermittent operation of the other polarized relay for operating the release magnet after a predetermined number of operations of the intermittently operated polarized relay if the selector is not then in released position.

2. A selector system comprising a control station and a remote station, a pair of conductors and common return connecting said stations, a polarized relay associated with each conductor responsive to current of predetermined polarity, a selector switch at the remote station having a stepping magnet and release magnet associated therewith, a source of current at the control station, means at said control station for causing a steady flow of current of the predetermined polarity to one of said conductors and the common return to thereby continuously operate the corresponding polarized relay and to intermittently apply a current flow of the predetermined polarity from said source to the other conductor and the common return to thereby intermittently operate the other polarized relay and means at said remote station responsive to the continued operation of the one polarized relay and the intermittent operation of the other polarized relay for operating the release magnet after a predetermined number of operations of the intermittently operated polarized relay if the selector is not then in released position and for rendering the stepping magnet responsive to further operations of the intermittently operated polarized relay to thereby step the selector switch.

3. A selector system comprising a control station and a remote station, a pair of conductors and common return connecting said stations, a polarized relay associated with each conductor responsive to current of predetermined polarity, a selector switch at the remote station having a stepping magnet and release magnet associated therewith, a source of current at the control station, means at said control station for causing a steady flow of current of the predetermined polarity to one of said conductors and the common return to thereby continuously operate the corresponding polarized relay and to intermittently apply a current flow of the predetermined polarity from said source to the other conductor and the common return to thereby intermittently operate the other polarized relay and electromagnetic means at said remote station controlling said release magnet, an initial operating circuit for said electro-magnetic means through the contacts of the intermittently operated polarized relay and a holding circuit through the contacts of the continuously operated polarized relay, said electromagnetic means being responsive to a predetermined number of operations of the intermittently operated polarized relay to cause the operation of the release magnet if the selector is not then in released position.

4. A selector system comprising a control station and a remote station, a pair of conductors and common return connecting said stations, a polarized relay associated with each conductor responsive to current of predetermined polarity, a selector switch at the remote station having a stepping magnet and release magnet associated therewith, a source of current at the control station, means at said control station for causing a steady flow of current of the predetermined polarity to one of said conductors and the common return to thereby continuously operate the corresponding polarized relay and to intermittently apply a current flow of the predetermined polarity from said source to the other conductor and the common return to thereby intermittently operate the other polarized relay and electromagnetic means at said remote station comprising two electromagnetic means for controlling said release magnet, means whereby the first of said two electromagnetic means is responsive to the continued operation of the one polarized relay and the first intermittent operation of the other polarized relay and means whereby the second of said two electromagnetic means operates upon the second operation of the second polarized relay and means operated by both said two means in combination for operating the release magnet if the selector is not in released position.

5. A selector system comprising a control station and a remote station, a pair of conductors and common return connecting said stations, a polarized relay associated with each conductor responsive to current of predetermined polarity, a selector switch at the remote station having a stepping magnet and release magnet associated therewith, a source of current at the control station, means at said control station for causing a steady flow of current of the predetermined polarity to one of said conductors and the common return to thereby continuously operate the corresponding polarized relay and to intermittently apply a current flow of the predetermined polarity from said source to the other conductor and the common return to thereby intermittently operate the other polarized relay and two electromagnetic means at said remote station, one of said two electromagnetic means being responsive to the continued operation of one polarized relay and the first operation of the other polarized relay and the second of said two electromagnetic means operating upon the second operation of said other polarized relay, a circuit for said release magnet controlled by said two electromagnetic means and a circuit for said stepping magnet conditioned, by the operation of said two electromagnetic means, to render said stepping magnet responsive to further operations of the intermittently operated polarized relay.

BERT A. WALLACE.